Patented Nov. 1, 1938

2,135,258

UNITED STATES PATENT OFFICE 2,135,258

LEUCO ESTERS OF THE ANTHRAQUINONE SERIES

Wilhelm Muenster, Ludwigshafen-on-the-Rhine, Wilhelm Bauer, Leverkusen, and Karl Koeberle and Max Bertl, Ludwigshafen-on-the-Rhine, Germany, assignors to General Aniline Works, Inc., New York, N. Y., a corporation of Delaware No Drawing. Application May 19, 1937, Serial No. 143,532. In Germany May 23, 1936

7 Claims. (Cl. 260—307)

The present invention relates to leuco esters of the anthraquinone series.

It is already known that by the action of sulphuric anhydride or agents supplying the same on compounds of the anthraquinone series capable of being vatted which contain a primary or secondary amino group, sulphamic acids are formed.

We have now found that by treating anthraquinonyl-azole compounds (anthraquinonyl-oxazoles, -thiazoles, -selenazoles, -imidazoles and the like) which have in the anthraquinone radical a primary or secondary amino group in ortho-position to the carbon atom of the azole ring with sulphur trioxide or agents supplying the same in the presence of a tertiary base and a metal and under mild conditions, leuco sulphuric esters of the said azoles are obtained. Contrasted with the formation of sulphamic acids described above, the amino groups are not changed in the case of the said ortho-aminoanthraquinone-azoles. The process according to this invention accordingly allows of the conversion of a group of important dyestuffs into a form which extends the scope of their use in a valuable way. In particular, with the new compounds dyeings may now be produced which could not hitherto be obtained with other leuco esters either as regards their tinctorial behaviour or as regards their fastness. In many respects these leuco esters are even superior in their tinctorial properties to the vat dyestuffs appertaining thereto.

As initial materials for the process according to this invention there may be mentioned for example anthraquinone-oxazoles, -thiazoles, -selenazoles and -imidazoles in which the azole ring is situated in a beta-position of the anthraquinone and which contain a primary or secondary amino group in ortho-position to the carbon atom of the azole ring. It is advantageous to use the 1-aminoanthraquinone-2-azoles and their derivatives. Of the last-mentioned azoles, those are of special value which also contain a vattable radical in the azole ring. For example the anthraquinone-azoles obtainable according to the U. S. Patent 1,790,102 may be mentioned. By suitable selection of the working conditions, up to four ester groups can be introduced into the molecule in the case of the last-mentioned compounds. From these tetra-esters, one or two sulphuric acid radicals may be split off again in weak acid solution depending on the duration of the reaction and the temperature. The initial materials should contain no unprotected amino groups other than the primary or secondary groups in ortho-position to the carbon atom of the azole ring.

The mild conditions to be maintained for a satisfactory course of the reaction are hereinafter briefly described. The esterification temperature is kept as low as possible, the action of the esterifying agent is allowed to continue only until the desired degree of esterification has been reached and care is taken that as far as possible no moisture is present. Generally speaking it is preferable to carry out the esterification in the presence of pyridine or alkyl-pyridines at temperatures below about 50° C. by means of sulphur trioxide, chlorsulphonic acid or mixtures of these two compounds.

The leuco esters thus obtained, usually in good yields and purity, generally speaking have excellent tinctorial properties and are in some cases superior to the hitherto known leuco esters of similar shades of color in color strength and fastness to washing, light and weathering. The solubility of the ester salts increases with the number of ester groups present; at the same time the absorptive power decreases. It is therefore a special advantage of the process according to this invention that the esterification can be carried on until there is obtained the stage of esterification desirable for the predetermined use of the leuco esters.

The following examples will further illustrate how the said invention may be carried out in practice but the invention is not restricted to these examples. The parts are by weight.

Example 1

15 parts of a mixture of 80 parts of sulphur trioxide and 20 parts of chlorsulphonic acid are allowed to drop while cooling into 150 parts of pyridine as free as possible from water and there are then introduced 13 parts of 1-amino-2-anthraquinonyl-alpha-mono-chlor-2'.3'-anthraquinone-oxazole and 13 parts of copper powder. The mixture is stirred for two hours at 35° C., whereby the dyestuff passes into solution giving a deep red-brown coloration. The pyridine salt of the leuco ester is precipitated by introduction into ice-water, the aqueous solution is separated off and the precipitate dissolved in a mixture of 1000 parts of water at 60° C. and 23 parts of 35 per cent caustic soda solution. The solution is heated under reduced pressure until pyridine no longer passes over, filtered and the salt of the leuco ester salted out from the deep red-brown colored solution by the addition of sodium or potassium chloride. A red-yellow precipitate is formed which is separated in the usual manner and brought into the form of paste or powder. The yield is very good. By development on the fibre in the usual manner, fast blue-red dyeings or prints are obtained.

The ester containing four sulphuric acid radicals may easily be converted into an ester containing only two such radicals. The latter has a remarkably better affinity to the fibre than the former. The said conversion may be effected by adding a little acetic acid to the solution of the compound containing four sulphuric acid radicals and further adding a little sodium nitrite. The said reaction results in a change of the coloration of the solution from red-orange to cherry-red. It is also possible to split off the two sulphuric acid radicals in the same operation as the dyeing itself. The ester containing two sulphuric acid radicals has an excellent affinity to the fibre which is remarkably superior to that of the corresponding tetra-ester and a good levelling power and dyes cotton articles, fibres, wool and silk fast red shades.

In a manner similar to that described above other anthraquinone oxazoles may be converted into sulphuric esters, such as anthraquinone oxazoles containing halogen atoms or other substituents, as for example alkoxy groups, cyano groups, alkylamino or acylamino groups. The chlorine or bromine atoms may, for example, stand in the 1- or 1'- or 3- or 3'-position.

*Example 2*

30 parts of copper powder and 30 parts of 1-amino - 2 - anthraquinonyl-2'.3'-anthraquinone-oxazole are added to a mixture of 300 parts of pyridine and 50 parts of chlorsulphonic acid, the whole being stirred for two hours at from 35° to 40° C. whereby the dyestuff passes entirely into solution. The pyridine salt of the leuco ester is precipitated by introducing the mixture into ice-water, the pyridine salt separated, advantageously by filtration by suction, and decomposed by heating with a mixture of 1500 parts of water and 45 parts of 35 per cent caustic soda solution under reduced pressure until pyridine no longer passes over. The red-brown ester solution is then filtered by suction and the filtrate salted out whereby the salt of the leuco ester is obtained in a very good yield. It contains four sulphuric acid radicals.

Instead of chlorsulphonic acid, there may also be used sulphur trioxide, mixtures of sulphur trioxide with sulphuric acid or chlorsulphonic acid, or chlorsulphonic acid esters. Iron powder may be used instead of copper. The pyridine salt of the leuco ester may also be dissolved in alkali solutions and the leuco ester separated by salting out.

When the ester solution obtained after distillation as above-described is slightly acidified for example with acetic acid and allowed to stand for a long time, advantageously at elevated temperature, an ester is obtained having three sulphuric acid radicals. The reaction may be accelerated somewhat by leading oxygen through the solution or adding a small amount of sodium nitrite or another oxidizing agent.

If the said action is continued somewhat longer, or a somewhat larger amount of an oxidizing agent is added, a violet-red solution is obtained which contains a deep violet-red leuco ester containing two sulphuric acid radicals.

The leuco ester having 3 or 2 ester groups may also be prepared by dissolving the above-mentioned tetra-ester in water, rendering the solution slightly acid and allowing to stand at elevated temperature.

The splitting off of one or two sulphuric acid radicals from the tetra-ester may also be carried out in the dyebath itself, for example by preparing a dyebath charged with 15 parts of the tetra-ester, 2 parts of 50 per cent acetic acid, 0.08 part of sodium nitrite and 50 parts of Glauber's salt. The three ester stages differ in the tinctorial behaviour mainly in the difference in their absorptive power which decreases as the number of ester groups increases.

*Example 3*

30 parts of 1-amino-2-anthraquinonyl-2'.3'-anthraquinone-thiazole and 30 parts of copper are added to a mixture of 300 parts of pyridine and 30 parts of a mixture of sulphur trioxide and chlorsulphonic acid in the ratio of 4:1, the whole being stirred for two hours at 35° C. The pyridine salt is precipitated by introducing the mixture into ice-water, separated from the supernatant solution, mixed with 2000 parts of water and 56 parts of 35 per cent caustic soda solution and the pyridine removed under reduced pressure. The copper is then filtered off by suction and the leuco ester is precipitated from the deep red-brown colored solution of the ester salt by the addition of 450 parts of sodium chloride.

In a manner similar to that described in the fourth paragraph of Example 2, the ester containing four sulphuric acid radicals may be converted into an ester having only two such radicals in the presence of a little sodium nitrite.

By treating 1-amino-4-ethoxy-2'-anthraquinonyl-2'.3'-anthraquinone-thiazole in the manner described in the first paragraph, an ester having four sulphuric acid radicals combined with the meso-positions of the two anthraquinone radicals is obtained. It dyes vegetable and similar fibres navy blue shades.

*Example 4*

A mixture of 80 parts of pyridine, 8 parts of chlorsulphonic acid, 5 parts of 1-amino-2-anthraquinonyl-4'-ethoxy-2'.3'-anthraquinone-oxazole and 5 parts of copper powder is stirred for 1½ hours at from 30° to 35° C. The pyridine salt of the resulting leuco ester is precipitated by introducing the mixture into ice-water, the supernatant solution is separated off and the residue heated at 45° C. under reduced pressure with 8.5 parts of 35 per cent caustic soda solution and 500 parts of water until pyridine no longer passes over. The solution is filtered and sodium chloride added thereto whereby the sodium salt is precipitated in the form of a red-yellow precipitate.

What we claim is:—

1. A leuco ester of the anthraquinone-azole series corresponding to the general formula

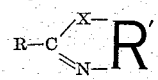

wherein R and R' are anthraquinone radicals of which R contains in ortho position to the carbon atom shown an amino group and X stands for a member selected from the class consisting of —O— and —S—, the linkages from X and N to R' standing in adjacent positions of R', which ester contains from two to four sulphuric ester groups combined with the meso-positions of the anthraquinone radicals.

2. A leuco ester of the anthraquinone-azole series corresponding to the general formula

wherein R and R' are anthraquinone radicals of which R contains in ortho position to the carbon atom shown an amino group the linkages from O and N to R' standing in adjacent positions of R', which ester contains from two to four sulphuric ester groups combined with the meso-positions of the anthraquinone radicals.

3. A leuco ester of the anthraquinone-azole series corrsponding to the general formula

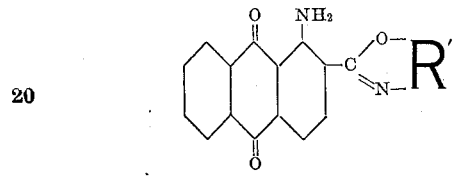

wherein R' is an anthraquinone radical, the linkages from O and N to R' standing in adjacent positions of R', in which from 2 to 4 of the meso-keto groups of the anthraquinone radicals are present in the reduced and esterfied state according to the formula $>C-O-SO_3H$.

4. A leuco ester of the anthraquinone-azole series corresponding to the general formula

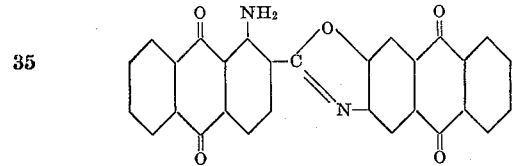

in which from 2 to 4 of the meso-keto groups of the anthraquinone radicals are present in the reduced and esterfied state according to the formula $>C-O-SO_3H$.

5. The leuco ester of the anthraquinone-azole series having the formula

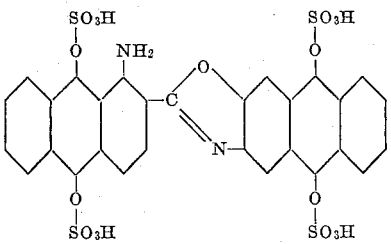

6. The leuco ester of the anthraquinone-azole series having the formula

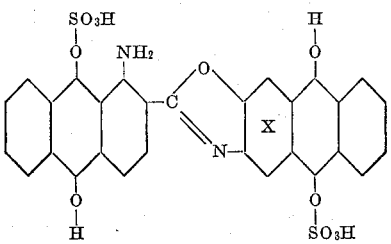

in which the nucleus marked X contains an atom of chlorine in an alpha position.

7. The leuco ester of the anthraquinone-azole series having the formula

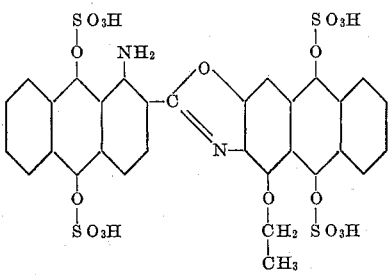

WILHELM MUENSTER.
WILHELM BAUER.
KARL KOEBERLE.
MAX BERTL.